(12) United States Patent
Yamada et al.

(10) Patent No.: US 11,165,333 B2
(45) Date of Patent: Nov. 2, 2021

(54) SNUBBER DEVICE AND POWER CONVERSION APPARATUS

(71) Applicant: FUJI ELECTRIC CO., LTD., Kanagawa (JP)

(72) Inventors: Ryuji Yamada, Hachioji (JP); Qichen Wang, Hino (JP); Kazuyuki Yoda, Kobe (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 0 days.

(21) Appl. No.: 16/693,378

(22) Filed: Nov. 25, 2019

(65) Prior Publication Data

US 2020/0244158 A1    Jul. 30, 2020

(30) Foreign Application Priority Data

Jan. 30, 2019  (JP) .............................. JP2019-013716

(51) Int. Cl.
*H02M 3/315*        (2006.01)
*H02M 1/34*         (2007.01)
(Continued)

(52) U.S. Cl.
CPC ............. *H02M 1/34* (2013.01); *H02M 3/315* (2013.01)

(58) Field of Classification Search
CPC ..... H02M 1/34; H02M 2001/342–348; H02M 3/315–3155; H02M 2001/327; H02M 7/003; H05K 5/0213; H05K 7/20909
See application file for complete search history.

(56) References Cited

U.S. PATENT DOCUMENTS 4,794,509 A  * 12/1988 Nussbaumer ...... H05K 7/20909
                                                  363/141
5,055,990 A  * 10/1991 Miki .................... H01L 25/165
                                                  363/56.05
(Continued)

FOREIGN PATENT DOCUMENTS

JP         H0833313 A      2/1996
JP         H09215343 A     8/1997
(Continued)

*Primary Examiner* — Sisay G Tiku

(57) ABSTRACT

A snubber device to be mounted to a terminal of a semiconductor module is provided. The snubber device includes n (n: integer of 1 or greater) parallel charge paths each having a positive-side capacitor, a first diode, and a negative-side capacitor sequentially connected in series between positive-side and negative-side terminals of the semiconductor module, and configured to enable current to flow from the positive-side terminal toward the negative-side terminal; and (n+1) parallel discharge paths each of which having a second diode connected between the negative-side terminal or the negative-side capacitor of an $N^{th}$ charge path (N: integer within a range of $0 \le N \le n$) of then charge paths and the positive-side capacitor of a $(N+1)^{th}$ charge path of the n charge paths or the positive-side terminal, and configured to enable current to flow from the negative-side terminal toward the positive-side terminal via at least one of the negative-side and positive-side capacitors.

20 Claims, 9 Drawing Sheets

(51) Int. Cl.
*H02M 1/32* (2007.01)
*H05K 5/02* (2006.01)
*H05K 7/20* (2006.01)

(56) References Cited

U.S. PATENT DOCUMENTS

| | | | | |
|---|---|---|---|---|
| 8,599,554 | B2 * | 12/2013 | Harada | H05K 7/209 |
| | | | | 361/688 |
| 9,893,643 | B1 * | 2/2018 | Honda | H01L 24/73 |
| 2001/0030037 | A1 * | 10/2001 | Hellbruck | H01L 23/4093 |
| | | | | 165/80.3 |
| 2012/0106220 | A1 * | 5/2012 | Yamaguchi | H05K 7/209 |
| | | | | 363/131 |
| 2012/0262884 | A1 * | 10/2012 | Meinecke | H02M 7/757 |
| | | | | 361/722 |
| 2017/0338734 | A1 * | 11/2017 | Nakashima | H02M 7/003 |
| 2018/0226383 | A1 * | 8/2018 | Yamaguchi | H01L 25/07 |
| 2019/0089240 | A1 * | 3/2019 | Hattori | H02M 7/537 |
| 2019/0206810 | A1 * | 7/2019 | Kanai | H05B 6/04 |
| 2019/0333909 | A1 * | 10/2019 | Sugita | H01L 25/112 |
| 2020/0053900 | A1 * | 2/2020 | Feurtado | H05K 7/20909 |
| 2021/0067030 | A1 * | 3/2021 | Yamada | H02M 1/14 |

FOREIGN PATENT DOCUMENTS

| | | | |
|---|---|---|---|
| JP | 2002125381 | A | 4/2002 |
| JP | 2012095473 | A | 5/2012 |
| JP | 2012110099 | A | 6/2012 |
| JP | 2014036509 | A | 2/2014 |
| JP | 2016144340 | * | 8/2016 |
| JP | 2016144340 | A | 8/2016 |

* cited by examiner

SNUBBER DEVICE AND POWER CONVERSION APPARATUS

The contents of the following Japanese patent application(s) are incorporated herein by reference:
2019-013716 filed in JP on Jan. 30, 2019

BACKGROUND

1. Technical Field

The present invention relates to a snubber device and a power conversion apparatus.

2. Related Art

In the related art, a variety of technologies for preventing element breakdown due to surge voltage are suggested (for example, refer to Patent Documents 1 to 8).
Patent Document 1: Japanese Patent Application Publication No. 2016-144340
Patent Document 2: Japanese Patent Application Publication No. H8-33313
Patent Document 3: Japanese Patent Application Publication No. 2002-125381
Patent Document 4: Japanese Patent Application Publication No. 2012-95473
Patent Document 5: Japanese Patent Application Publication No. 2014-36509
Patent Document 6: Japanese Patent Application Publication No. 2012-110099
Patent Document 7: Japanese Patent Application Publication No. H9-215343
Patent Document 8: Japanese Patent Application Publication No. 2012-95473

SUMMARY

In recent years, it is needed to implement a snubber device capable of effectively solving the surge voltage, in association with increase in current of a semiconductor module.

In order to solve the above problem, a first aspect of the present invention provides a snubber device to be mounted to a terminal of a semiconductor module. The snubber device may include n (n: integer of 1 or greater) parallel charge paths each of which having a positive-side capacitor, a first diode, and a negative-side capacitor sequentially connected in series between a positive-side terminal and a negative-side terminal of the semiconductor module, and configured to enable current to flow from the positive-side terminal toward the negative-side terminal. The snubber device may include (n+1) parallel discharge paths each of which having a second diode connected between the negative-side terminal or the negative-side capacitor of an $N^{th}$ charge path (N: integer within a range of $0 \le N \le n$) of the n charge paths and the positive-side capacitor of a $(N+1)^{th}$ charge path of the n charge paths or the positive-side terminal, and configured to enable current to flow from the negative-side terminal toward the positive-side terminal via at least one of the negative-side capacitor and the positive-side capacitor.

A second aspect of the present invention provides a power conversion apparatus. The power conversion apparatus may include at least one snubber device according to the first aspect. The power conversion apparatus may include a plurality of semiconductor modules electrically connected to the at least one snubber device. The power conversion apparatus may include a plurality of heat sinks each of which being attached to at least one of the plurality of semiconductor modules.

The plurality of semiconductor modules may be configured to generate polyphase AC power from DC power. The power conversion apparatus may include at least one heat sink for each phase of the AC power.

The plurality of semiconductor modules may be configured to generate at least single phase AC power from DC power. The power conversion apparatus may include the plurality of heat sinks for each phase of the AC power.

The plurality of semiconductor modules may be configured to generate polyphase AC power from DC power. The plurality of heat sinks may be attached to some of the plurality of semiconductor modules configured to generate at least two phases of the polyphase AC power.

Each of the plurality of heat sinks may be attached to one semiconductor module.

The power conversion apparatus may further include a power supply capacitor connected between the positive-side terminal and the negative-side terminal. The plurality of semiconductor modules may be connected to the power supply capacitor by different wires.

A third aspect of the present invention provides a power conversion apparatus. The power conversion apparatus may include a semiconductor module. The power conversion apparatus may include the snubber device according to the first aspect. The power conversion apparatus may include a power supply capacitor connected between the positive-side terminal and the negative-side terminal. The power conversion apparatus may include a housing configured to accommodate the semiconductor module, the snubber device and the power supply capacitor. The power supply capacitor may be arranged on one side from a center of the housing, and the snubber device and the semiconductor module may be arranged on the other side from the center of the housing.

The power supply capacitor may be arranged on a lower side from the center of the housing and the snubber device and the semiconductor module may be arranged on an upper side from the center of the housing.

The power conversion apparatus may further include a cooling unit configured to enable a cooling fluid to flow in the housing. The power supply capacitor may be arranged upstream of a flow path of the cooling fluid. The snubber device and the semiconductor module may be arranged downstream of the flow path of the cooling fluid.

The power supply capacitor may be arranged in an inlet part of the cooling fluid into the housing.

The power conversion apparatus may further include a heat shield plate provided between the snubber device and semiconductor module and the power supply capacitor.

The power conversion apparatus may further include a heat sink attached to the semiconductor module.

A wiring inductance of each charge path may be smaller than a wiring inductance of each discharge path.

In the snubber device of the first aspect, a wiring length of each charge path may be shorter than a wiring length of each discharge path.

n may be an integer of 2 or greater. A wiring length of each wiring part between the positive-side capacitor and the negative-side capacitor of each of the n charge paths may be shorter than a wiring length of each wiring part, which connects the negative-side capacitor of the $N^{th}$ charge path and the positive-side capacitor of the $(N+1)^{th}$ charge path of each of the (n+1) discharge paths.

The wiring part of each of the (n+1) discharge paths may be formed with detouring.

The positive-side capacitor, the negative-side capacitor, the first diode and the second diode may be arranged on a printed wiring board.

Each wiring, which connects the negative-side capacitor of the $N^{th}$ charge path and the positive-side capacitor of the $(N+1)^{th}$ charge path, of each of the (n+1) discharge paths may include two regions overlapping each other.

Each charge path may be linearly arranged between the positive-side terminal and the negative-side terminal.

A fourth aspect of the present invention provides a power conversion apparatus. The power conversion apparatus may include a semiconductor module. The power conversion apparatus may include the snubber device according to the first aspect.

In the meantime, the summary of the present invention does not necessarily describe all necessary features of the present invention. The present invention may also be a sub-combination of the features described above.

BRIEF DESCRIPTION OF THE DRAWINGS

FIG. 3 shows flow of current when the switching device 11 is turned on.

DESCRIPTION OF EXEMPLARY EMBODIMENTS

Hereinbelow, an embodiment of the present invention will be described. The embodiment does not limit the invention according to the claims. Also, all combinations of features described in the embodiment are not necessarily essential to solving means of the invention.

1. Circuit Configuration of Power Conversion Apparatus

Figure 1:
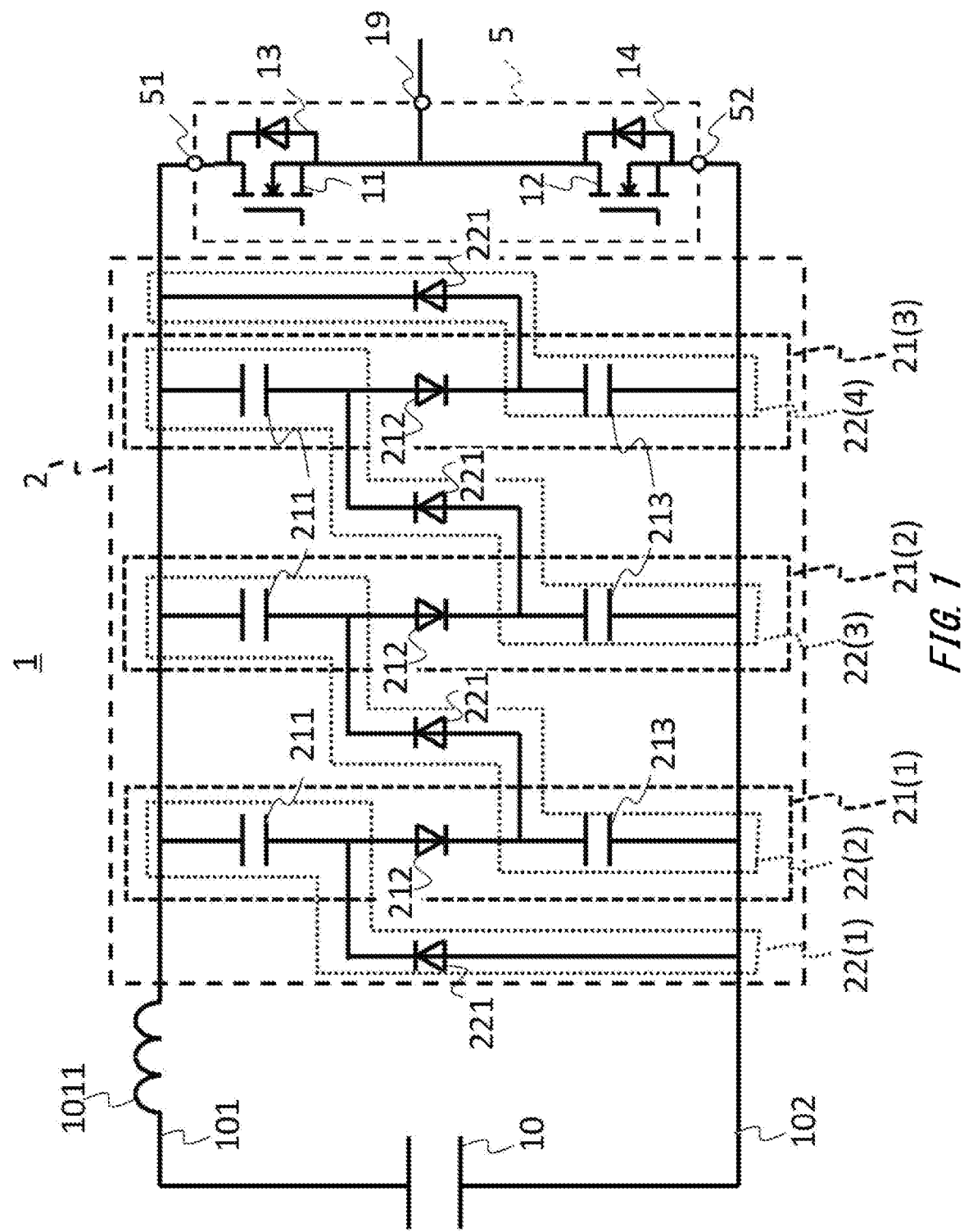
FIG. 1 shows a circuit diagram of a power conversion apparatus 1 according to a present embodiment.

FIG. 1 shows a circuit diagram of a power conversion apparatus 1 according to the present embodiment. The power conversion apparatus 1 is a circuit for one phase configured to convert DC power into polyphase AC power. The power conversion apparatus 1 is configured to output, from a power supply output terminal 19, voltage converted by switching connection between each electrode of a power supply capacitor 10 and the power supply output terminal 19. In the meantime, a return path of AC current to be output may be the power supply output terminal 19 for other phase. The power supply output terminal 19 may be connected to an inductive load (not shown). The power conversion apparatus 1 includes a power supply capacitor 10, switching devices 11 and 12, freewheeling diodes 13 and 14, and a snubber circuit 2. In the meantime, the power conversion apparatus 1 may be configured to convert the DC power into single phase AC power. In this case, the power conversion apparatus 1 may include two power supply capacitors 10 connected in series, and the return path of AC current to be output from the power supply output terminal 19 may be a center point between the power supply capacitors 10.

The power supply capacitor 10 is configured to function as a DC power supply. A positive electrode of the power supply capacitor 10 is connected to a positive-side power supply line 101, and a negative electrode is connected to a negative-side power supply line 102. The positive-side power supply line 101 and the negative-side power supply line 102 may be provided with a wiring inductance 1011, depending on wiring lengths thereof. In FIG. 1, one power supply capacitor 10 is shown. However, the power conversion apparatus 1 may include a plurality of power supply capacitors 10 connected in series or in parallel.

The switching devices 11 and 12 are sequentially connected in series between the negative-side power supply line 102 and the positive-side power supply line 101. The switching devices 11 and 12 may configure an upper arm and a lower arm in the power conversion apparatus 1.

Each of the switching devices 11 and 12 is connected at a drain terminal to the positive-side power supply line 101 and is connected at a source terminal to the negative-side power supply line 102. Gate terminals of the switching devices 11 and 12 are connected to a gate driving circuit (not shown), so that on and off operations of the switching devices 11 and 12 are controlled. For example, the switching devices 11 and 12 may be controlled so that they are to be selectively in a connection state with dead time, for which both the switching devices are in off states, being provided therebetween. The switching devices 11 and 12 may be controlled in a PWM manner. A center point between the switching device 11 and the switching device 12 is connected to the power supply output terminal 19.

The switching devices 11 and 12 may be silicon semiconductor elements of which a base material is silicon or wide band gap semiconductor elements. The wide band gap semiconductor element is a semiconductor element having a bandgap greater than the silicon semiconductor element, and is, for example, a semiconductor element including SiC, GaN, diamond, a gallium nitride-based material, a gallium oxide-based material, AlN, AlGaN, ZnO or the like. In the meantime, the switching devices 11 and 12 may be MOS-FETs or semiconductor elements having other structure, such as IGBT, bipolar transistor and the like.

The freewheeling diodes 13 and 14 are anti-parallel connected to the switching devices 11 and 12 so that a side facing toward the positive-side power supply line 101 is to be a cathode, respectively. The freewheeling diodes 13 and 14 may be Schottky barrier diodes. The freewheeling diodes 13 and 14 may be silicon semiconductor elements or wide band gap semiconductor elements.

At least two of the switching devices 11 and 12 and the freewheeling diodes 13 and 14 may be modularized as a semiconductor module 5. In the present embodiment, as an example, the switching devices 11 and 12 and the freewheeling diodes 13 and 14 are modularized as the semiconductor module 5. In this case, the drain terminal of the positive-side switching device 11 is favorably a positive-side terminal 51 of the semiconductor module 5, and the source terminal of the negative-side switching device 12 is favorably a negative-side terminal 52 of the semiconductor module 5.

[1.1. Snubber Circuit 2]

The snubber circuit 2 is configured to protect each element of the power conversion apparatus 1 by absorbing surge voltage that is generated when the switching devices 11 and 12 interrupt current. The snubber circuit 2 includes n parallel charge paths 21 and (n+1) parallel discharge paths 22. In the meantime, n is an integer of 1 or greater, and is 3, for example, in the present embodiment. Also, in the present embodiment, as an example, the three charge paths 21 are referred to as a first charge path 21(1), a second charge path 21(2) and a third charge path 21(3), in corresponding order from the left in the drawings. Also, the four discharge paths 22 are referred to as a first discharge path 22(1), a second discharge path 22(2), a third discharge path 22(3), and a fourth discharge path 22(4), in corresponding order from the left in the drawings.

Each charge path 21 has a positive-side capacitor 211, a first diode 212, and a negative-side capacitor 213 sequentially connected in series between the positive-side terminal 51 and the negative-side terminal 52. The positive-side capacitor 211 and the negative-side capacitor 213 function as snubber capacitors, respectively, and may be configured to absorb instantaneous surge voltage to be generated while the switching devices 11 and 12 are driven (as an example, surge voltage to be applied to an element during a period greater than 10 ns and shorter than 10 μs). For example, the positive-side capacitor 211 and the negative-side capacitor 213 may suppress vibrations higher than 100 kHz and lower than 100 MHz. The positive-side capacitor 211 and the negative-side capacitor 213 may be film capacitors or laminated ceramic capacitors, as an example.

The first diode 212 is arranged so that an anode faces toward the positive-side terminal 51 and a cathode faces toward the negative-side terminal 52. Thereby, each charge path 21 enables the current to flow from the positive-side terminal 51 toward the negative-side terminal 52.

Each discharge path 22 has a second diode 221. The second diode 221 is connected between the negative-side terminal 52 or the negative-side capacitor 213 of a $N^{th}$ charge path 21 (N: integer within a range of 0≤N≤n) of the n charge paths 21 and the positive-side capacitor 211 of a $(N+1)^{th}$ charge path 21 of the n charge paths 21 or the positive-side terminal 51. For example, the second diode 221 of the first discharge path 22(1) is connected between the negative-side terminal 52 and the positive-side capacitor 211 of the first charge path 21(1). The second diode 221 of the second discharge path 22(2) is connected between the negative-side capacitor 213 of the first charge path 21(1) and the positive-side capacitor 211 of the second charge path 21(2). The second diode 221 of the third discharge path 22(3) is connected between the negative-side capacitor 213 of the second charge path 21(2) and the positive-side capacitor 211 of the third charge path 21(3). The second diode 221 of the fourth discharge path 22(4) is connected between the negative-side capacitor 213 of the third charge path 21(3) and the positive-side terminal 51. The second diode 221 is arranged so that an anode faces toward the $N^{th}$ charge path 21(N) or the negative-side terminal 52 and a cathode faces toward the $(N+1)^{th}$ charge path 21(N+1) or the positive-side terminal 51. Thereby, each discharge path 22 enables the current to flow from the negative-side terminal 52 toward the positive-side terminal 51 via at least one of the negative-side capacitor 213 and the positive-side capacitor 211.

[1.1.1. Operations of Snubber Circuit 2]

First, operations are described which are performed when the switching device 11 is turned off in a state in which the switching device 12 is in an on state and the switching device 11 is in an off state. In the state in which the switching device 11 is in an on state and the switching device 12 is in an off state, the output current flows through a path of the power supply capacitor 10, the positive-side power supply line 101, the switching device 11 and the power supply output terminal 19. At this time, the output current flows through the wiring inductance 1011 and energy is accumulated therein.

Figure 2:
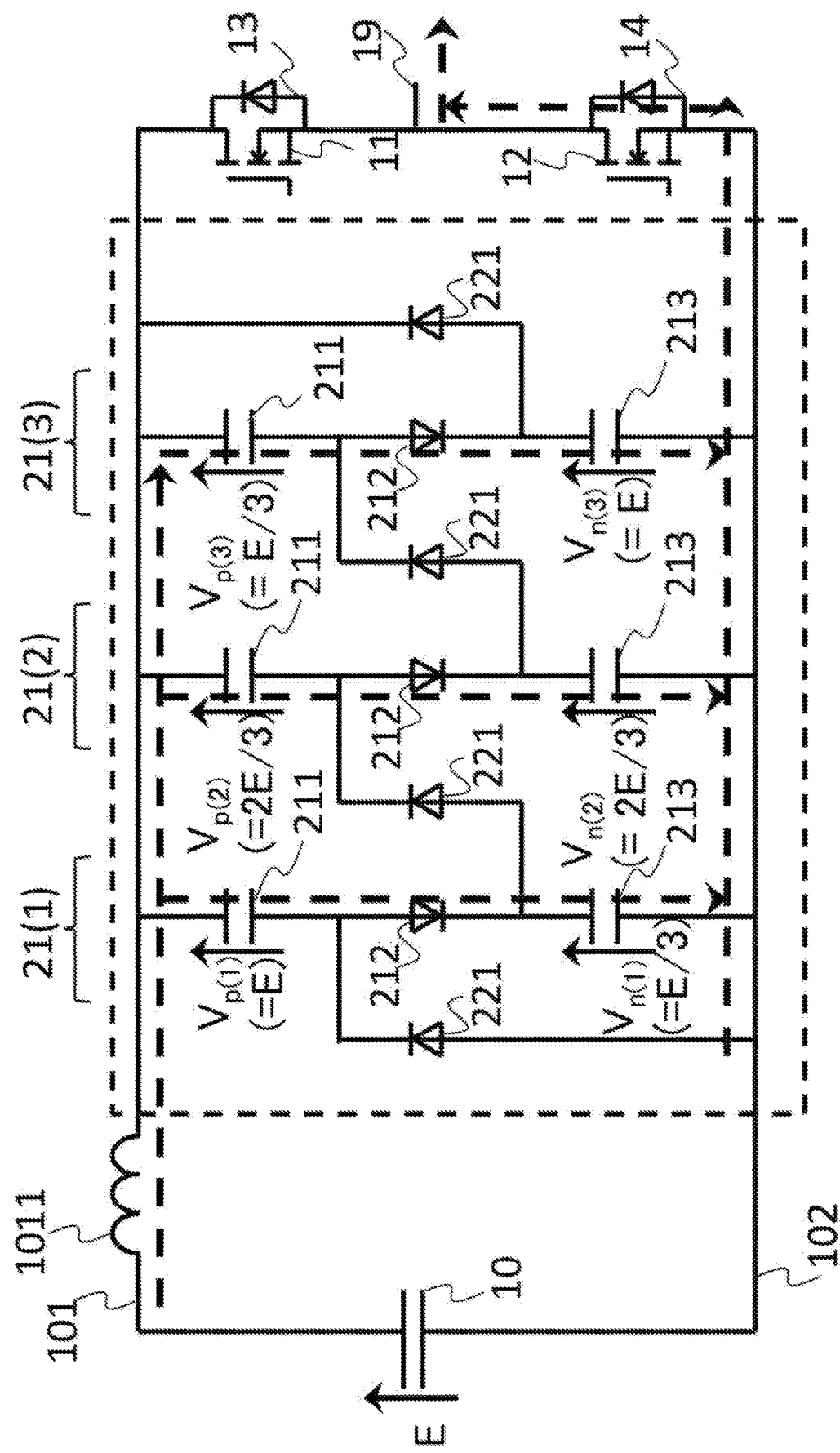
FIG. 2 shows flow of current when a switching device 11 is turned off.

FIG. 2 shows flow of current when the switching device 11 is turned off from such state. In the meantime, the broken arrows in FIG. 2 indicate the flow of current, and the solid arrows indicate voltages of the power supply capacitor 10, the positive-side capacitor 211 and the negative-side capacitor 213.

When the switching device 11 is turned off, the output current is commutated, so that it flows from the power supply capacitor 10 and the positive-side power supply line 101 through the positive-side capacitor 211, the first diode 212 and the negative-side capacitor 213 of each charge path 21 and is output from the power supply output terminal 19 via the freewheeling diode 14. Thereby, the current energy of the wiring inductance 1011 is absorbed by charging of the positive-side capacitor 211 and negative-side capacitor 213 of the charge path 21. Then, the output current is all finally commutated to a path of the power supply capacitor 10, the negative-side power supply line 102, the freewheeling diode 14 and the power supply output terminal 19. Thereby, the commutation associated with the turn-off operation of the switching device 11 is completed.

Figure 3:
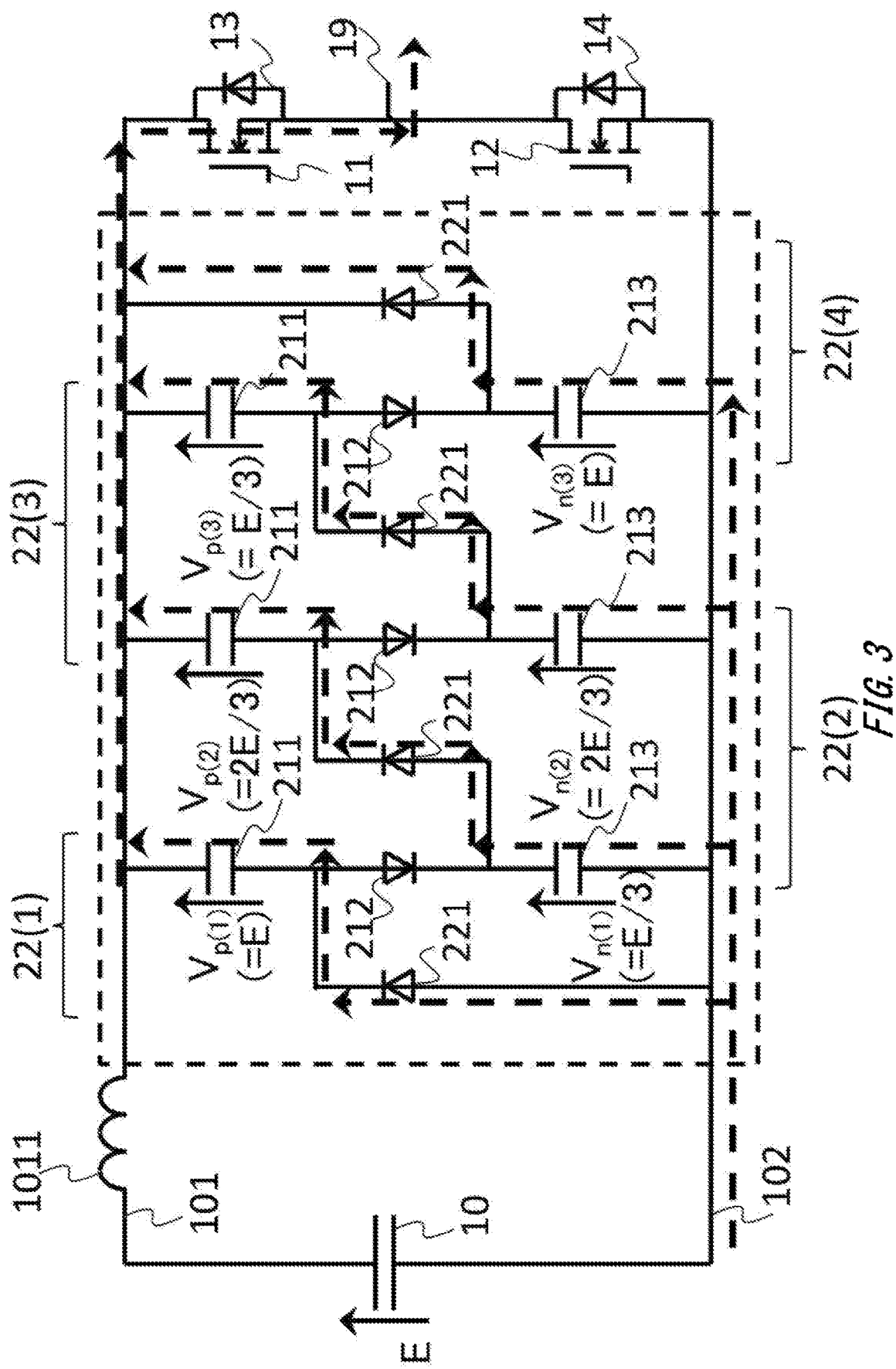

FIG. 3 shows flow of current when the switching device 11 is again turned on from the state in which the turn-off operation of the switching device 11 is completed.

When the switching device 11 is again turned on, the output current flowing through the path of the power supply capacitor 10, the negative-side power supply line 102, the freewheeling diode 14 and the power supply output terminal 19 is commutated to a path of the power supply capacitor 10, the negative-side power supply line 102, the second diode 221 of each discharge path 22, the switching device 11 and the power supply output terminal 19. At this time, the energy during the turn-off operation, which is accumulated in the positive-side capacitor 211 and/or the negative-side capacitor 213 provided on the anode-side/cathode-side of the second diode 221, is released. Then, the output current is all finally commutated to the path of the power supply capacitor 10, the positive-side power supply line 101, the switching device 11 and the power supply output terminal 19. Thereby, the commutation associated with the turn-on operation of the switching device 11 is completed.

The voltages of the positive-side capacitor 211 and the negative-side capacitor 213 during the turn-off and turn-on operations of the switching device 11 are described. During the turn-off operation, a relationship between the voltages of the positive-side capacitor 211 and the negative-side capacitor 213 of each charge path 21 is expressed by a following equation (1). In the equation, E indicates voltage of the power supply capacitor 10, and $V_{dc-off}$ indicates voltage between the terminals, i.e., voltage between the positive-side terminal 51 and the negative-side terminal 52 during the turn-off operation. Also, $V_{p(1)}$ to $V_{p(3)}$ indicate voltages of the positive-side capacitors 211 of the first charge path 21(1) to the third charge path 21(3). Also, $V_{n(1)}$ to $V_{n(3)}$ indicate voltages of the negative-side capacitors 213 of the first charge path 21(1) to the third charge path 21(3).

$$\begin{aligned} E &\le (V_{p(1)} + V_{n(1)}) \\ &= (V_{p(2)} + V_{n(2)}) \\ &= (V_{p(3)} + V_{n(3)}) \\ &= V_{dc-off} \end{aligned} \quad (1)$$

Also, during the turn-on operation, a relationship between the voltages of the positive-side capacitor 211 and the negative-side capacitor 213 of each charge path 21 is expressed by a following equation (2). In the equation, $V_{dc\text{-}on}$ indicates voltage between the terminals, i.e., voltage between the positive-side terminal 51 and the negative-side terminal 52 during the turn-on operation.

$$\begin{aligned} E \geq V_{p(1)} &\qquad (2)\\ &= (V_{n(1)} + V_{p(2)})\\ &= (V_{n(2)} + V_{p(3)})\\ &= V_{n(3)}\\ &= V_{dc-on} \end{aligned}$$

By the equations (1) and (2), a relationship between voltages of each positive-side capacitor 211 and each negative-side capacitor 213 is expressed by a following equation (3) (also, refer to the voltages shown in FIG. 2 and FIG. 3). In the equation, $V_{dc}$ indicates voltage between the terminals, i.e., voltage between the positive-side terminal 51 and the negative-side terminal 52 in a stationary state.

$$\begin{aligned} E = V_{dc} \approx V_{p(1)} &\qquad (3)\\ &= V_{n(3)}\\ &= 1.5 \times V_{p(2)}\\ &= 15 \times V_{n(2)}\\ &= 3 \times V_{n(1)}\\ &= 3 \times V_{p(3)} \end{aligned}$$

From the equation (3), it can be seen that, when capacitor current is interrupted, a charge voltage (as an example, 4E/3 in FIG. 3) of each charge path 21 is higher than a discharge voltage (as an example, E in FIG. 3) of each discharge path 22. In the meantime, also in the turn-on and turn-off operations of the switching device 12 when the output current flows in a reverse direction, the similar effects are achieved due to symmetry of the circuit, and the detailed descriptions thereof are thus omitted.

According to the snubber circuit 2 in the power conversion apparatus 1 described above, the n parallel charge paths 21 each of which has the positive-side capacitor 211 and the negative-side capacitor 213 are provided. Therefore, when the current is interrupted by the semiconductor module 5, the energy accumulated in the wiring inductance 1011 charges the positive-side capacitor 211 and the negative-side capacitor 213 to voltages higher than the voltage between the positive-side terminal 51 and the negative-side terminal 52, through each charge path 21. Thereby, element breakdown, which is caused due to the surge voltage, is prevented.

Also, the snubber circuit 2 is provided with the (n+1) discharge paths 22 configured to enable the current to flow from the negative-side terminal 52 toward the positive-side terminal 51 via at least one of the negative-side capacitor 213 and the positive-side capacitor 211. Therefore, when the current is enabled to flow by the semiconductor module 5, the energy accumulated in the positive-side capacitor 211 and the negative-side capacitor 213 is discharged and the discharge voltage of each discharge path 22 is reduced to the voltage between the positive-side terminal 51 and the negative-side terminal 52.

Here, when the current is interrupted, the charge voltage of each of the n charge paths 21 is higher than the discharge voltage of each of the discharge paths 22, so that the energy having charged the charge path 21 as a result of the interruption of current cannot further charges the charge path 21 even if the energy is discharged by the discharge path 22. Therefore, the energy having charged the positive-side capacitor 211 and the negative-side capacitor 213 when the current is interrupted is accumulated and recovered by the positive-side capacitor 211 and the negative-side capacitor 213 without being charged and discharged and thus consumed as loss of circuit by a resonance operation of the wiring inductance 1011 and the positive-side capacitor 211 and negative-side capacitor 213. Thereby, the loss of circuit due to the resonance operation is reduced.

Also, since the element breakdown due to the surge voltage upon the interruption of current is prevented and the loss of circuit is reduced, an acceptable amount of inductance of wirings connected to the positive-side terminal 51 and the negative-side terminal 52 can be increased. That is, it is possible to increase a degree of freedom of wiring lengths of the positive-side power supply line 101 and the negative-side power supply line 102.

2. Physical Configuration of Power Conversion Apparatus

Figure 4:
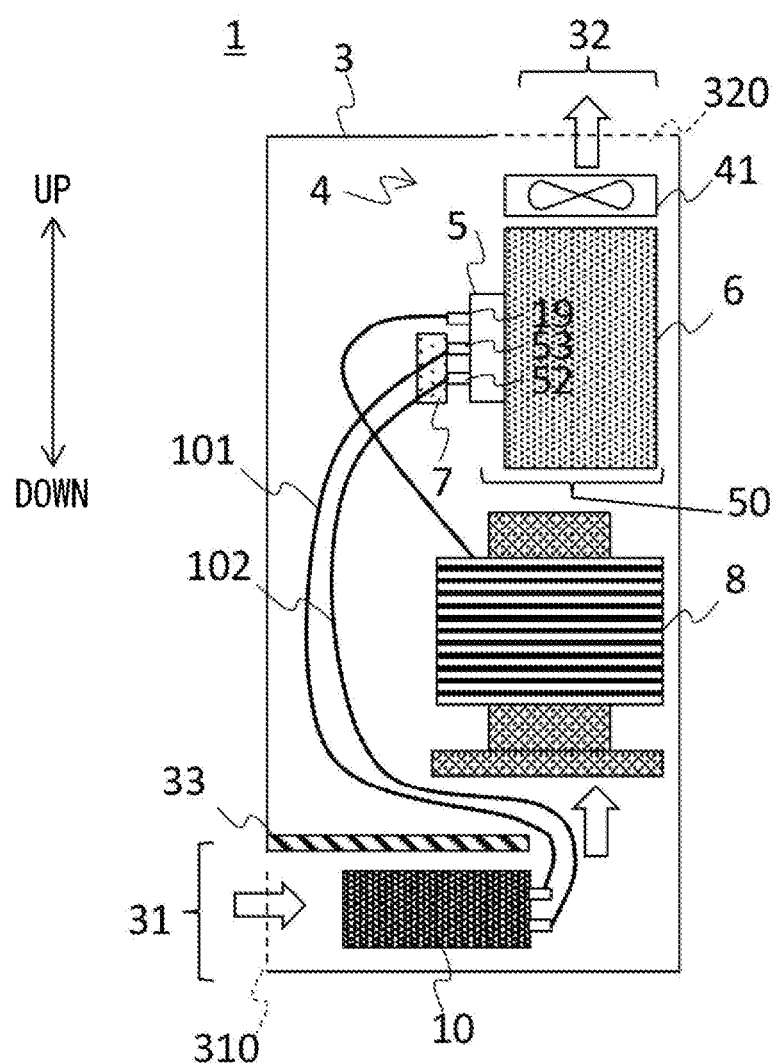
FIG. 4 is a longitudinal sectional view of the power conversion apparatus 1 according to the present embodiment.

FIG. 4 is a longitudinal sectional view of the power conversion apparatus 1 according to the present embodiment. In the present embodiment, as an example, the power conversion apparatus 1 is configured to convert the DC power into the single phase or polyphase AC power. However, the other types of conversion such as boosting and step-down of DC voltage can also be performed. The power conversion apparatus 1 may be a UPS (Uninterruptible Power Supply) or a power conditioning system. The power conversion apparatus 1 includes a housing 3, a cooling unit 4, at least one power supply capacitor 10, at least one semiconductor module 5, a heat sink 6, and at least one snubber device 7. The power conversion apparatus 1 may further include other elements and a device 8.

[2.1. Housing 3]

The housing 3 is configured to accommodate each semiconductor module 5, each snubber device 7 and each power supply capacitor 10. The housing 3 has an inlet part 31, an outlet part 32 and a heat shield plate 33.

The inlet part 31 is a region into which air is to be introduced from an outside of the housing 3 by the cooling unit 4, and is provided in a lower end portion of the housing 3. The inlet part 31 has an air intake port 310 provided in a sidewall part of the housing 3, The outlet part 32 is a region from which the air is to be exhausted to the outside of the housing 3 by the cooling unit 4, and is provided in an upper end portion of the housing 3. The outlet part 32 has an exhaust port 320 provided in a top part of the housing 3.

The heat shield plate 33 is provided above the inlet part 31. The heat shield plate 33 may be provided in a lateral direction (as an example, a horizontal direction) so as to prevent radiation and convection in a vertical direction. The heat shield plate 33 may be provided to extend from the sidewall part of the housing 3, in which the air intake port 310 is provided, toward an opposite sidewall part. The heat shield plate 33 may be formed of ceramic or the like, for example.

[2.2. Cooling Unit 4]

The cooling unit 4 is configured to supply air into the housing 3. For example, the cooling unit 4 includes at least one fan 41. Each fan 41 is configured to suck the external air of the housing 3 from the air intake port 310 and to exhaust the air from the exhaust port 320. For example, each fan 41 may be provided in the exhaust port 320 of the housing 3. In the housing 3, the air may flow as shown with the outline arrow in FIG. 4. In the meantime, in the present embodiment, as an example, a flow path of the air by the cooling unit 4 is one but may be plural. Also, the cooling unit 4 may be configured to supply a fluid different from the air into the housing 3. For example, the cooling unit 4 has a cooling pipe (not shown) passing the inside of the housing 3, and may be configured to supply water into the cooling pipe.

[2.3. Power Supply Capacitor 10]

Each power supply capacitor 10 may be an electrolytic capacitor or a film capacitor. In the meantime, for the power supply capacitor 10, a using upper limit temperature such as 85° C. or 105° C. may be set. The power supply capacitor 10 may be a capacitor conforming to a so-called Arrhenius's law (also referred to as "10° C. double rule), so that the lifetime may decrease by half as the using temperature rises by 10° C.

In the meantime, when the power conversion apparatus 1 is provided with a plurality of power supply capacitors 10, each electrode of the plurality of power supply capacitors 10 may be connected by a bus bar (not shown). Also, when the plurality of power supply capacitors 10 is provided, the plurality of power supply capacitors 10 may be configured as one unit for easy movement, equipment and removal of the power supply capacitors 10.

[2.4. Semiconductor Module 5]

Each semiconductor module 5 is configured by modularizing a plurality of semiconductor elements. For example, each semiconductor module 5 is a power semiconductor module, and is configured to convert the DC power supplied from the power supply capacitor 10 into at least single phase AC power. In the present embodiment, as an example, each semiconductor module 5 has one set of the switching devices 11 and 12 functioning as the upper and lower arms but may have only one of the switching devices 11 and 12 or a plurality of sets of the switching devices 11 and 12. Each semiconductor module 5 may have the positive-side terminal 51 and the negative-side terminal 52 connected to each of the electrodes of the power supply capacitor 10.

[2.5. Heat Sink 6]

The heat sink 6 is configured to absorb heat that is generated from at least each semiconductor module 5. The heat sink 6 may have radiating fins (not shown) provided on an opposite surface to the semiconductor module. The heat sink 6 may be attached to each semiconductor module 5 to configure a semiconductor stack 50 (also referred to as 'complex body').

[2.6. Snubber Device 7]

Each snubber device 7 has the snubber circuit 2. Each snubber device 7 is mounted to a terminal of the semiconductor module 5. In the present embodiment, as an example, the number of the snubber devices 7 is the same as that of the semiconductor modules 5, and each snubber device 7 is mounted to one corresponding semiconductor module 5.

[2.7. Device 8]

The device 8 is, for example, a transformer, in the present embodiment, and is configured to transform and output the AC power generated from the power supply output terminal 19 of the semiconductor module 5. In the meantime, the device 8 may be other device or element, such as a reactor for suppressing change in current.

[2.8. Arrangement of Respective Units]

The power supply capacitor 10 and the semiconductor stack 50 may be arranged without being closely located each other. For example, the power supply capacitor 10 and the semiconductor stack 50 may be arranged with being spaced from each other by a distance greater than a dimension thereof in the vertical direction. Also, the power supply capacitor 10 and the semiconductor stack 50 may be arranged with being spaced from each other by such a distance that they are not to be thermally influenced due to the air flowing between the power supply capacitor 10 and the semiconductor stack 50 by the cooling unit 4. As an example, the power supply capacitor 10 and the semiconductor stack 50 may be arranged with being spaced from each other by a distance of 200 mm or greater.

Also, each power supply capacitor 10 may be arranged on one side from a center of the housing 3, and each snubber device 7 and the semiconductor stack 50 may be arranged on the other side from the center of the housing 3. For example, each power supply capacitor 10 may be arranged on a lower side from the center of the housing 3 and each snubber device 7 and the semiconductor stack 50 may be arranged on an upper side from the center of the housing 3. As an example, each snubber device 7 and the semiconductor stack 50 may be arranged on an opposite side to the power supply capacitor 10 with respect to the heat shield plate 33. That is, the heat shield plate 33 may be interposed between the snubber device 7 and semiconductor stack 50 and the power supply capacitor 10.

Also, each power supply capacitor 10 may be arranged upstream of the flow path of the air in the housing 3, each snubber device 7 and the semiconductor stack 50 may be arranged downstream of the flow path of the air. In the present embodiment, as an example, each power supply capacitor 10 is arranged in the inlet part 31 for air. Also, each snubber device 7 and the semiconductor stack 50 are arranged below the exhaust port 320.

In the meantime, the positive-side power supply line 101 and the negative-side power supply line 102 for interconnecting the semiconductor module 5 and the power supply capacitor 10 may be formed by covered wires without using the bus bar or the laminated bus bar. Thereby, the manufacturing cost of the power conversion apparatus 1 is reduced. A wiring inductance between the semiconductor module 5 and the power supply capacitor 10 may be greater than a wiring inductance between the semiconductor module 5 and the snubber device 7 by five times.

The device 8 may be arranged between the snubber device 7 and semiconductor stack 50 and the power supply capacitor 10. In the present embodiment, as an example, the device 8 is arranged between the snubber device 7 and semiconductor stack 50 and the heat shield plate 33.

According to the power conversion apparatus 1 described above, since the power supply capacitor 10 is arranged on one side of the housing 3 and the snubber device 7 and the semiconductor stack 50 are arranged on the other side of the housing 3, it is possible to reduce the heat transfer from the snubber device 7 and the semiconductor module 5 to the power supply capacitor 10. Therefore, it is possible to prevent an increase in temperature of the power supply capacitor 10 and to thus prolong the lifetime of the power supply capacitor 10. Also, the snubber device 7 having the snubber circuit 2 is provided. The snubber device 7 and semiconductor module 5 and the power supply capacitor 10 are arranged on the opposite sides in the housing 3, so that even if the wirings connected to the positive-side terminal 51 and the negative-side terminal 52 are lengthened, it is possible to prevent the element breakdown due to the surge voltage upon the interruption of current, and to reduce the loss of circuit.

Also, since the power supply capacitor 10 is arranged upstream of the flow path of the air and the snubber device 7 and the semiconductor stack 50 are arranged downstream of the flow path, it is possible to prevent the heat generated from the snubber device 7 and the semiconductor module 5 from being transferred to the power supply capacitor 10 via the air. Also, since the power supply capacitor 10 is arranged in the inlet part 31 for air, it is possible to effectively cool the power supply capacitor 10 and to maintain the same at low temperatures.

Furthermore, since the power supply capacitor 10 is arranged on the lower side of the housing 3 and the snubber device 7 and semiconductor stack 50 are arranged on the upper side of the housing 3, it is possible to prevent the heat transfer to the power supply capacitor 10 when the heat generated from the snubber device 7 and the semiconductor module 5 warms the inside of the housing 3 by convection.

In addition, since the heat shield plate 33 is provided between the snubber device 7 and semiconductor stack 50 and the power supply capacitor 10, it is possible to prevent the heat generated from the snubber device 7 and the semiconductor module 5 from being transferred to the power supply capacitor 10.

3. Outer Configuration of Semiconductor Module 5 and Snubber Device 7

Figure 5:
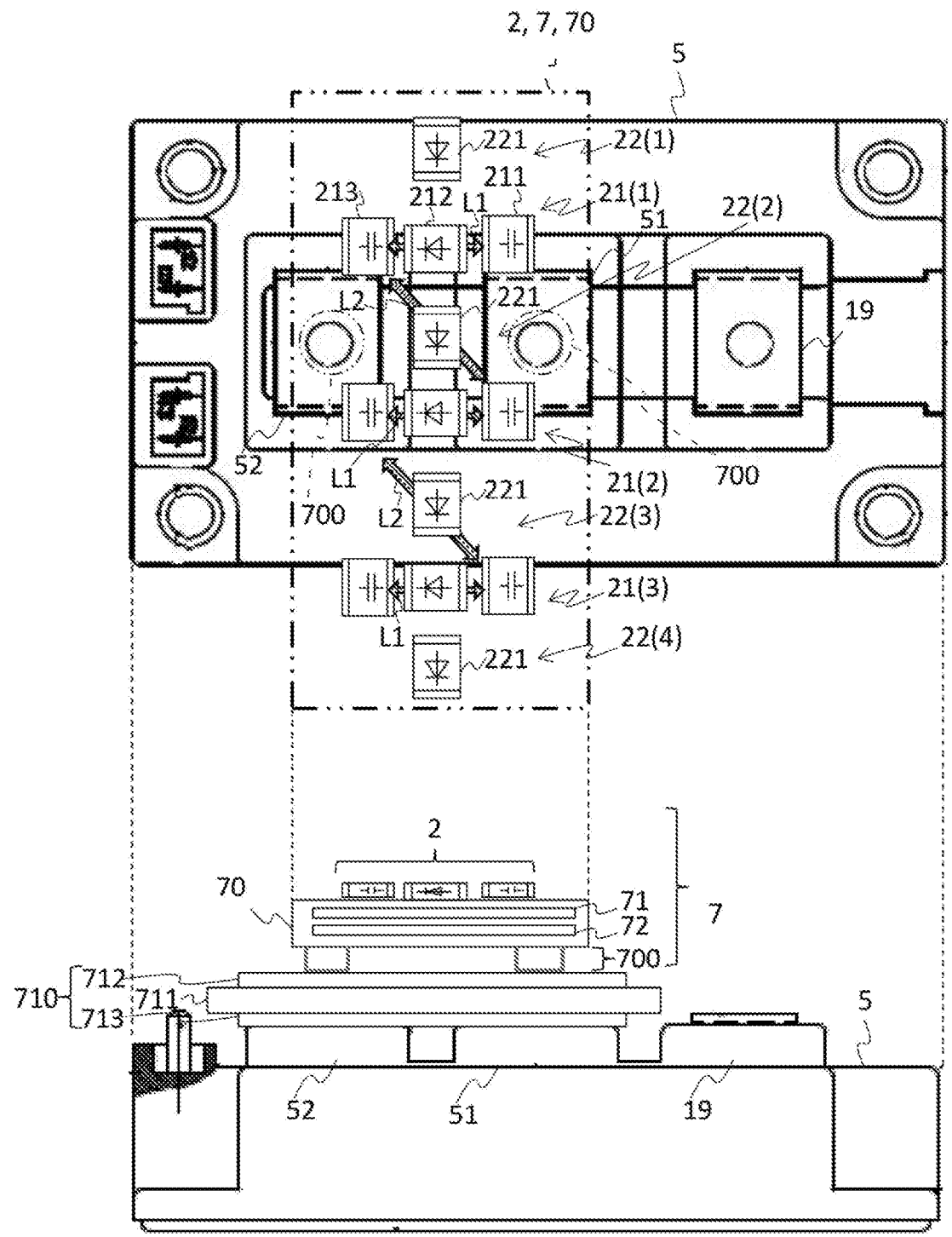
FIG. 5 shows outer configurations of a semiconductor module 5 and a snubber device 7.

FIG. 5 shows outer configurations of the semiconductor module 5 and the snubber device 7. In the meantime, the upper and lower parts in FIG. 5 show the outer configurations of the semiconductor module 5 and the snubber device 7, as seen from different directions.

The semiconductor module 5 has a cuboid shape, and is provided on its upper surface with the negative-side terminal 52, the positive-side terminal 51 and the power supply output terminal 19. The negative-side terminal 52, the positive-side terminal 51 and the power supply output terminal 19 may be linearly aligned in corresponding order. In the meantime, the semiconductor module 5 may further include a control terminal connected to the gate terminals of the switching devices 11 and 12.

The snubber device 7 has the snubber circuit 2 provided on a printed circuit board 70. For example, the positive-side capacitor 211, the negative-side capacitor 213, the first diode 212 and the second diode 221 of the snubber circuit 2 are arranged on the printed circuit board 70.

In FIG. 5, the reference signs for the positive-side capacitor 211, the first diode 212 and the negative-side capacitor 213 of the charge paths 21(2) and 21(3) of the snubber device 7 are omitted. Also, in FIG. 5, only wiring parts L1 and L2 between the positive-side capacitor 211 and the negative-side capacitor 213 are pictorially shown by shaded arrows, and wirings between the other elements are omitted.

Here, the wiring part L1 is a wiring part between the positive-side capacitor 211 and the negative-side capacitor 213 of each charge path 21. The wiring part L2 is a wiring part, which connects the negative-side capacitor 213 of the $N^{th}$ charge path 21 and the positive-side capacitor 211 of the $(N+1)^{th}$ charge path 21, of each of the (n+1) discharge paths 22. In the present embodiment, as an example, the second discharge path 22(2) of the four discharge paths 22 has the wiring part L2 connecting the negative-side capacitor 213 of the first charge path 21(1) and the positive-side capacitor 211 of the second charge path 21(2). Also, the third discharge path 22(3) has the wiring part L2 connecting the negative-side capacitor 213 of the second charge path 21(2) and the positive-side capacitor 211 of the third charge path 21(3).

In the snubber device 7 of the present embodiment, a wiring inductance of each of the n (three, as an example, in the present embodiment) charge paths 21 may be smaller than a wiring inductance of each discharge path 22. Also, a wiring length of each charge path 21 may be shorter than a wiring length of each discharge path 22. For example, a wiring length of each charge path 21 connecting the positive-side terminal 51 and the negative-side terminal 52 may be shorter than a wiring length of each discharge path 22 connecting the positive-side terminal 51 and the negative-side terminal 52. Also, a wiring length of each wiring part L1 of the three charge paths 21 may be shorter than a wiring length of each wiring part L2 of the (n+1) discharge paths 22. In the present embodiment, as an example, each charge path 21 is linearly arranged between the positive-side terminal 51 and the negative-side terminal 52, and the wiring part L1 of the charge path 21 has a linear shape. In the meantime, the wiring part L2 may not be provided with an inductor as a circuit element.

The printed circuit board 70 has a positive-side wiring 71 and a negative-side wiring 72 connected to the positive-side terminal 51 and the negative-side terminal 52 of the semiconductor module 5 via terminals 700. The positive-side wiring 71 and the negative-side wiring 72 have a planar shape, respectively, and are laminated with an insulation layer being interposed therebetween. Thereby, the positive-side wiring 71 and the negative-side wiring 72 act differentially to cancel magnetic fields each other, so that the inductances of the positive-side wiring 71 and the negative-side wiring 72 are reduced. Also, the current to charge the positive-side capacitor 211 and the negative-side capacitor 213 flows uniformly between the plurality of charge paths 21.

In the meantime, a laminated bus bar 710 may be interposed between the snubber device 7 and the semiconductor module 5. The laminated bus bar 710 has planar wiring layers 712 and 713 laminated with an insulation layer 711 being interposed therebetween. Thereby, the wiring layers 712 and 713 act differentially to cancel magnetic fields each other, so that inductances of the wiring layers 712 and 713 are reduced. The wiring layer 712 may be connected to one of the positive-side terminal 51 and the negative-side terminal 52 via a connection terminal (not shown), and the wiring layer 713 may be connected to the other of the positive-side terminal 51 and the negative-side terminal 52 via a connection terminal (not shown).

According to the snubber device 7 described above, since the positive-side capacitor 211, the negative-side capacitor 213, the first diode 212 and the second diode 221 are arranged on the printed circuit board 70, it is possible to easily adjust the wiring lengths of the charge path 21 and the discharge path 22.

Also, the wiring length of each charge path 21 is shorter than the wiring length of each discharge path 22, and the wiring inductance of the charge path 21 is smaller than the wiring inductance of the discharge path 22. Therefore, it is possible to reduce the surge voltage, which is generated when the current is interrupted by the semiconductor module 5, and to suppress a peak of discharge current when the current is enabled to flow by the semiconductor module 5.

Furthermore, the wiring length L1 of each wiring part between the positive-side capacitor 211 and the negative-side capacitor 213 of the charge path 21 is shorter than the wiring length L2 of each wiring part, which connects the negative-side capacitor 213 of the $N^{th}$ charge path 21 and the positive-side capacitor 211 of the $(N+1)^{th}$ charge path 21, of the discharge path 22. Therefore, it is possible to securely shorten the wiring length of each charge path 21, as compared to the wiring length of each discharge path 22.

Also, since each charge path 21 is linearly arranged between the positive-side terminal 51 and the negative-side terminal 52, the wiring length of the charge path 21 can be minimized.

In the meantime, as an example, in FIG. 5, the plurality of charge paths 21 and the plurality of discharge paths 22 are alternately arranged on the printed circuit board 70. However, the plurality of charge paths 21 may be collectively arranged on a central part of the printed circuit board 70, and the plurality of discharge paths 22 may be arranged on both sides of the charge paths 21.

4. Shape of Wiring Part L2

Figure 6:
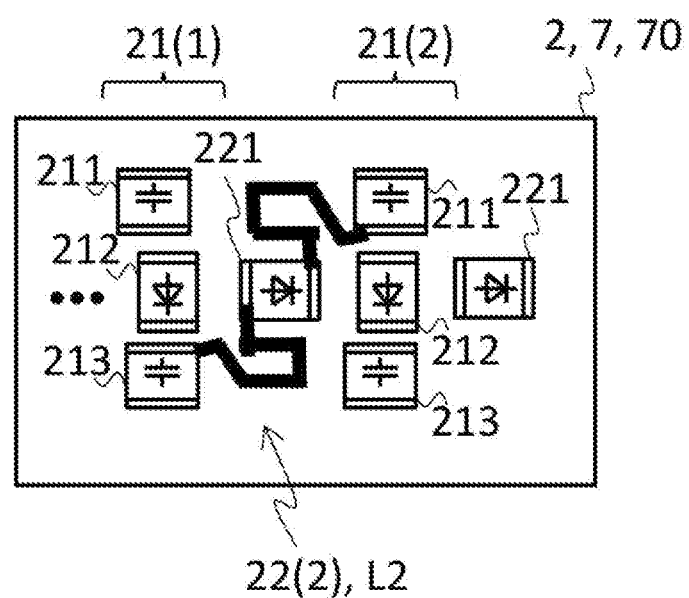
FIG. 6 shows a shape of a wiring part L2.

FIG. 6 shows a shape of the wiring part L2. In FIG. 6, only the wiring part L2 between the positive-side capacitor 211 and the negative-side capacitor 213 is pictorially shown with the thick line, and the wirings between the other elements are not shown.

As shown in FIG. 6, the wiring part L2 of the discharge path 22 may be formed with detouring. For example, the wiring part L2 is formed with detouring an in-plane wiring pattern of the printed circuit board 70 between the positive-side capacitor 211 and the second diode 221 and/or between the negative-side capacitor 213 and the second diode 221.

According to the wiring part L2 described above, it is possible to securely shorten the wiring length of each charge path 21, as compared to the wiring length of each discharge path 22.

Figure 7:
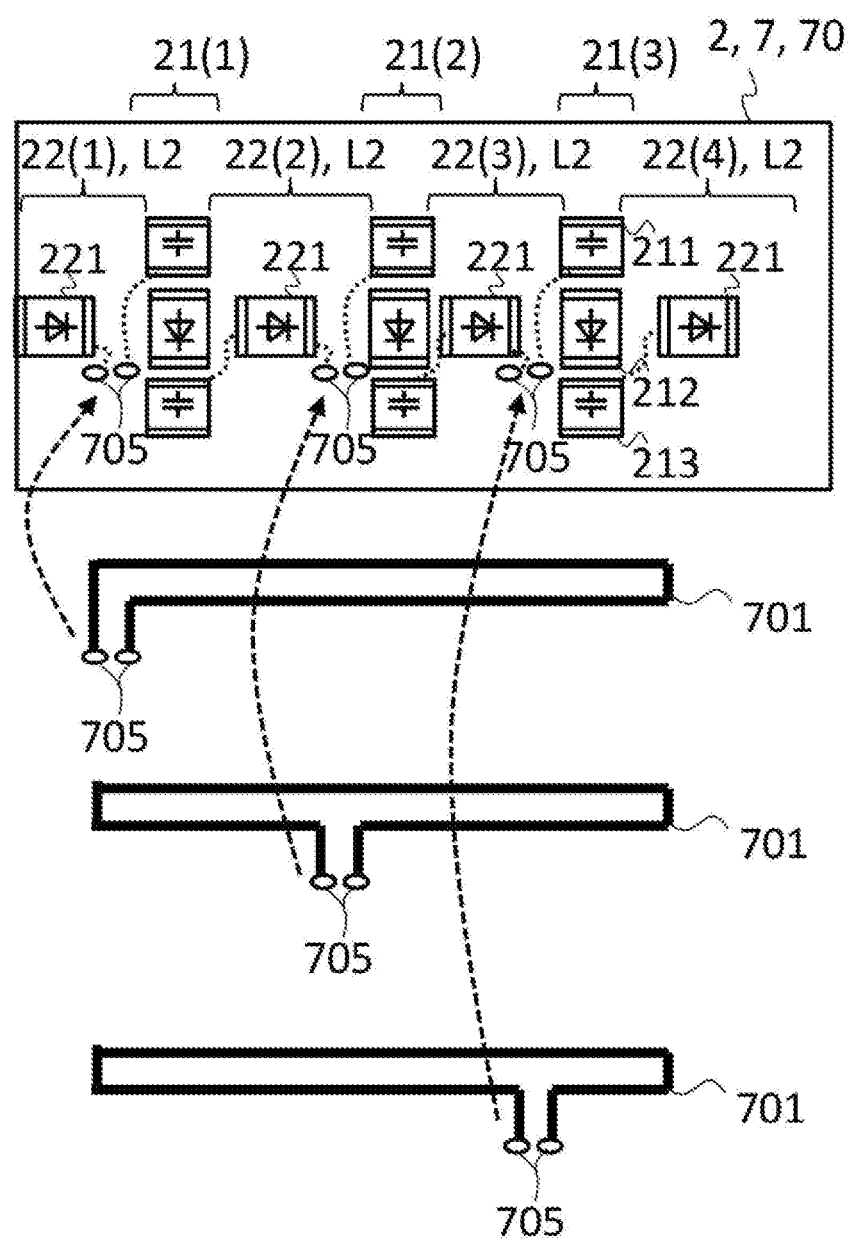
FIG. 7 shows another shape of the wiring part L2.

FIG. 7 shows another shape of the wiring part L2. In FIG. 7, only the wiring part L2 between the positive-side capacitor 211 and the negative-side capacitor 213 of the wirings in the printed circuit board 70 is pictorially shown with the dotted line, and the wirings between the other elements are not shown. Also, the reference signs for the positive-side capacitor 211, the first diode 212 and the negative-side capacitor 213 of the charge paths 21(1) and 21(2) are omitted.

As shown in FIG. 7, the wiring part L2 may be drawn out of the printed circuit board 70. For example, the wiring part L2 may have two lands 705 of the printed circuit board 70 and a loop-shaped covered wire 701 connected between the two lands 705. Also, the covered wires 701 provided to the wiring parts L2 of the separate discharge paths 22 may be arranged close to each other. Thereby, the close portions of one covered wire 701 or the close portions of the plurality of covered wires 701 act additively to reinforce the magnetic fields or to increase the inductance of the covered wire 701. In this case, it is possible to suppress more securely the peak of the discharge current when the current is enabled to flow by the semiconductor module 5.

Also, the wiring part L2 may include two regions overlapping each other. In FIG. 7, as an example, the wiring part L2 has a region extending in a right and left direction on the upper side in FIG. 7, and a region extending in the right and left direction on the lower side, and the two regions overlap each other. Thereby, the overlapping regions act additively to reinforce the magnetic fields or to increase the inductance of the wiring part L2. In this case, it is possible to suppress more securely the peak of the discharge current when the current is enabled to flow by the semiconductor module 5.

In the meantime, in FIG. 7, for simple illustrations, the covered wire 701 is shown separately from the printed circuit board 70. Also, in FIG. 7, the two lands 705 and the covered wire 701 are provided between the second diode 221 and the positive-side capacitor 211 of the wiring part L2. Alternatively or additionally, the two lands 705 and the covered wire 701 may be provided between the second diode 221 and the negative-side capacitor 213.

Figure 8:
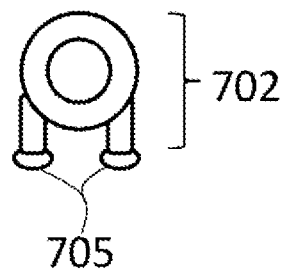
FIG. 8 shows another shape of the wiring part L2.
Figure 9:
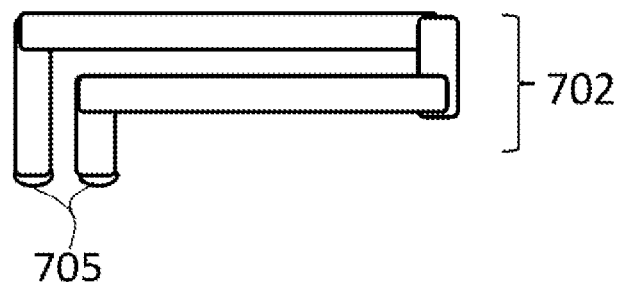
FIG. 9 shows another shape of the wiring part L2.
Figure 10:
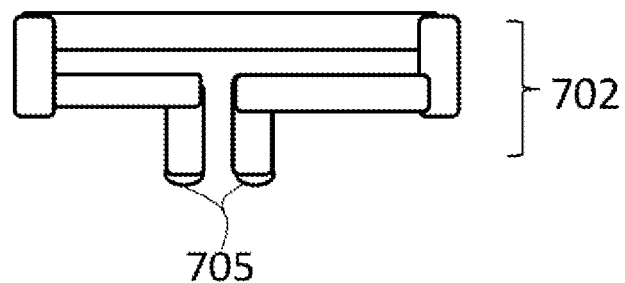
FIG. 10 shows another shape of the wiring part L2.

FIGS. 8 to 10 show other shapes of the wiring part L2. The wiring part L2 may have a plurality of conduction bars 702 connected in a loop shape between the two lands 705. The conduction bars 702 provided to the wiring parts L2 of the separate discharge paths 22 may be arranged closely to each other. The conduction bar 702 may be formed of conductive metal, for example, copper.

5. Modified Example

Figure 11:
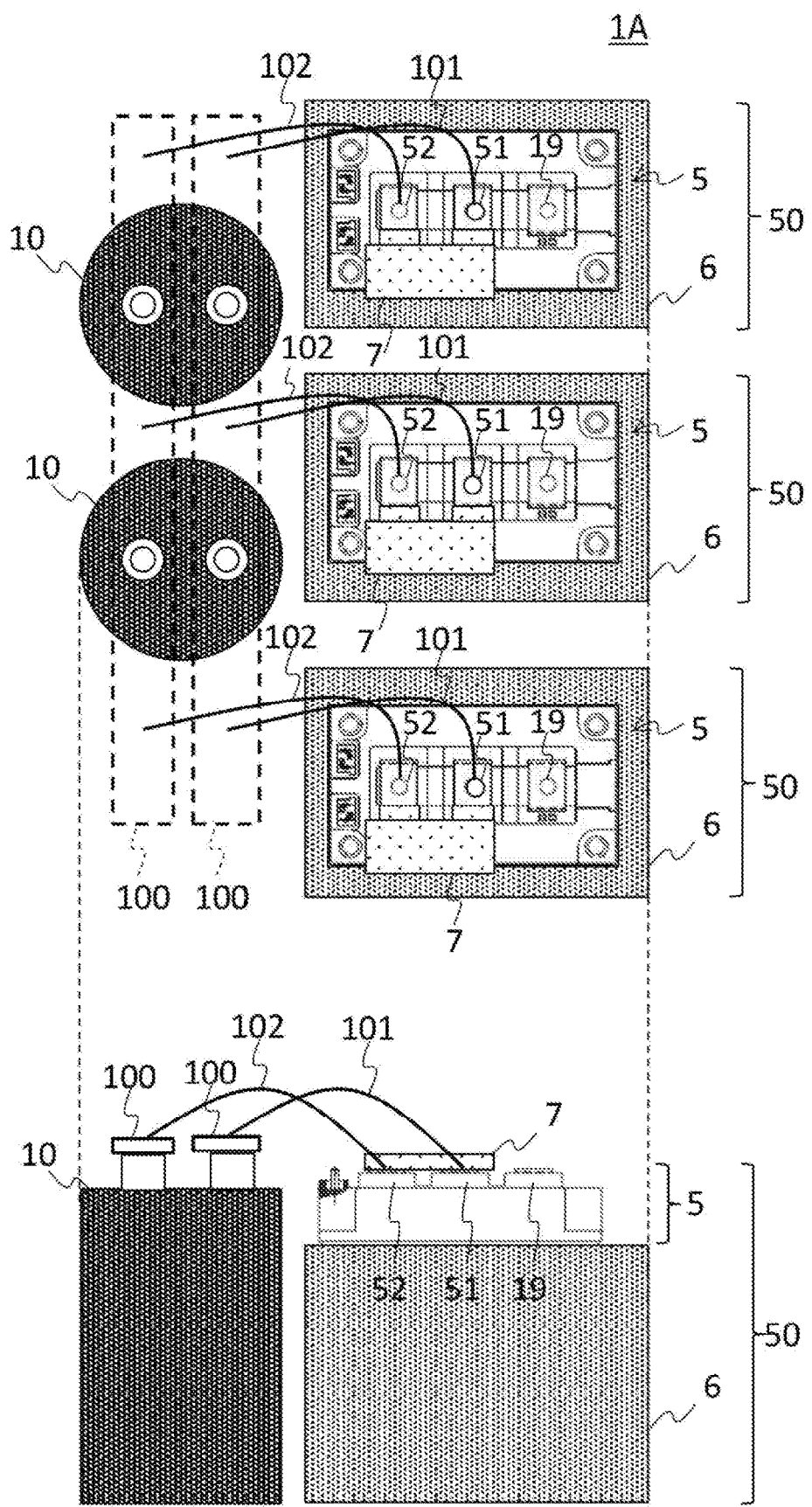
FIG. 11 shows a power conversion apparatus 1A according to a modified example.

FIG. 11 shows a power conversion apparatus 1A according to a modified example. In FIG. 11, the upper and lower parts show outer configurations of the power conversion apparatus 1A, as seen from different directions. Also, in FIG. 11, the housing 3, the cooling unit 4, the device 8 and the like are not shown. The power conversion apparatus 1A may not have at least one of the housing 3, the cooling unit 4 and the device 8. Also, the power supply capacitor 10 and the semiconductor stack 50 of the power conversion apparatus 1A are not necessarily required to be respectively arranged on one and other sides of the housing 3.

The power conversion apparatus 1A according to the present modified example includes one or more power supply capacitors 10, at least one snubber device 7, a plurality of semiconductor modules 5 electrically connected to at least one snubber device 7, and a plurality of heat sinks 6 each of which is attached to at least one of the plurality of semiconductor modules 5. In FIG. 11, the two power supply capacitors 10 are shown but the number thereof is not particularly limited. Also, in a case in which the plurality of semiconductor modules 5 is configured to generate the polyphase AC power, the power conversion apparatus 1A may have at least one heat sink 6 for each phase of the AC power. Also, in a case in which the plurality of semiconductor modules 5 is configured to generate AC power having a single phase or a plurality of phases (also referred to as polyphase), the power conversion apparatus 1A may have a plurality of heat sinks 6 for each phase of the AC power. In the present modified example, as an example, the plurality of semiconductor modules 5 is configured to convert the DC power into three-phase AC power, and the power conversion apparatus 1A includes the three snubber devices 7, the three semiconductor modules 5 and the three heat sinks 6, each of which is provided for each of U, V and W phases of the three-phase AC power. In the meantime, in the case in which the plurality of semiconductor modules 5 is configured to generate the polyphase AC power, the plurality of heat sinks 6 may be attached to a part of the plurality of semiconductor module 5 configured to generate at least two phases of the polyphase AC power, in other words, may be attached to the semiconductor module 5, which generates at least two phases, of all the semiconductor modules 5 of the power conversion apparatus 1A.

Each semiconductor module 5 may be connected to one or more power supply capacitors 10 by different wires. In the present modified example, as an example, the electrodes of the plurality of power supply capacitors 10 are connected to common bus bars 100, and the terminals of each semiconductor module 5 are connected to the bus bars 100.

Each heat sink 6 configures the semiconductor stack 50 together with the semiconductor module 5 to which the heat sink is attached. In the present modified example, as an example, the three heat sinks 6 are respectively attached to one semiconductor module 5, so that a total of three semiconductor stacks 50 are configured. A weight of each semiconductor stack 50 is favorably 20 kg or less.

According to the power conversion apparatus 1A described above, the plurality of heat sinks 6 is provided and attached to at least one of the plurality of semiconductor modules 5. Therefore, unlike a case in which a single heat sink 6 is provided and is attached to the plurality of semiconductor modules 5, it is possible to reduce a weight of each semiconductor stack 50 configured by the semiconductor module 5 and the heat sink 6, and to facilitate the maintenance. Also, since the snubber device 7 having the snubber circuit 2 is provided, even if the wirings connected to the positive-side terminal 51 and the negative-side terminal 52 are lengthened due to the plurality of heat sinks 6, it is possible to prevent the element breakdown due to the surge voltage upon the interruption of current, and to reduce the loss of circuit.

Also, since the plurality of semiconductor modules 5 and the plurality of heat sinks 6 configure one or more semiconductor stacks 50 for each phase of the three-phase AC power, it is possible to subdivide the semiconductor stacks 50 and to reduce the weight thereof. Also, since the plurality of the semiconductor stacks 50 has one semiconductor module 5, respectively, it is possible to further reduce the weight of the semiconductor stacks 50, as compared to a case in which the semiconductor stack has the plurality of semiconductor modules 5.

Furthermore, since the plurality of semiconductor modules 5 is connected to the power supply capacitors 10 by the different wires, it is possible to increase a degree of freedom of arrangement of the semiconductor stacks 50 and the power supply capacitors 10 in the housing 3.

Also, since the heat sink 6 is attached to the semiconductor module 5, it is possible to prevent the heat generated from the semiconductor module 5 from being transferred to the power supply capacitor 10.

6. Other Modified Examples

In the embodiment and modified example, the numbers of the snubber devices 7 and the semiconductor modules 5 are the same but may be different. For example, the number of the snubber devices 7 may be smaller than the number of the semiconductor modules 5. In this case, one snubber device 7 may be attached to the plurality of semiconductor modules 5 configured to generate AC power having one or more phases. Also, the number of the snubber devices 7 may be larger than the number of the semiconductor modules 5. In this case, the plurality of snubber devices 7 may be attached to one semiconductor module 5.

Also, it has been described that the heat shield plate 33 is provided between the snubber device 7 and semiconductor stack 50 and the power supply capacitor 10. However, the housing 3 may be provided therein with a plurality of rooms, and the power supply capacitor 10, the snubber device 7 and the semiconductor stack 50 may be arranged in the separate rooms. In this case, the heat shield plate may serve as a partition of the rooms.

Although the present invention has been described with reference to the embodiments, the technical scope of the present invention is not limited to the scope described in the embodiments. It is obvious to one skilled in the art that the embodiments can be diversely changed or improved. It is obvious from the claims that the changes or improvements can also be included within the technical scope of the present invention.

The operations, procedures, steps, and stages of each process performed by an apparatus, system, program, and method shown in the claims, embodiments and drawings can be performed in any order as long as the order is not explicitly indicated by "prior to," "before," or the like and as long as the output from a previous process is not used in a later process. Even if the process flow is described using phrases such as "first" or "next" in the claims, embodiments and drawings, it does not necessarily mean that the process must be performed in this order.

REFERENCE SIGNS LIST

1: power conversion apparatus, 2: snubber circuit, 3: housing, 4: cooling unit, 5: semiconductor module, 6: heat sink, 7: snubber device, 10: power supply capacitor, 11: switching device, 12: switching device, 13: freewheeling diode, 14: freewheeling diode, 19: power supply output terminal, 21: charge path, 22: discharge path, 31: inlet part, 32: outlet part, 33: heat shield plate, 41: fan, 50: semiconductor stack, 51: positive-side terminal, 52: negative-side terminal, 70: printed circuit board, 71: positive-side wiring, 72: negative-side wiring, 100: bus bar, 101: positive-side power supply line, 102: negative-side power supply line, 211: positive-side capacitor, 212: first diode, 213: negative-side capacitor, 221: second diode, 310: air intake port, 320: exhaust port, 700: terminal, 701: covered wire, 702: conduction bar, 1011: wiring inductance

What is claimed is:

1. A power conversion apparatus comprising:
   a semiconductor module;
   a snubber device mounted on terminals of the semiconductor module, wherein the snubber device comprises
      n (n: integer of 1 or greater) parallel charge paths each of which having a positive-side capacitor, a first diode, and a negative-side capacitor sequentially connected in series between a positive-side terminal and a negative-side terminal of the semiconductor module, and configured to enable current to flow from the positive-side terminal toward the negative-side terminal, and
      (n+1) parallel discharge paths each of which having a second diode connected between the negative-side terminal or the negative-side capacitor of an Nth charge path (N: integer within a range of 0≤N≤n) of the n charge paths and the positive-side capacitor of a (N+1)th charge path of the n charge paths or the positive-side terminal, and configured to enable current to flow from the negative-side terminal toward the positive-side terminal via at least one of the negative-side capacitor and the positive-side capacitor;
   a power supply capacitor connected between the positive-side terminal and the negative-side terminal; and
   a housing configured to accommodate the semiconductor module, the snubber device and the power supply capacitor,
   wherein the power supply capacitor is arranged on one side from a center of the housing, and the snubber device and the semiconductor module are arranged on the other side from the center of the housing.

2. The power conversion apparatus according to claim 1, wherein the power supply capacitor is arranged on a lower side from the center of the housing and the snubber device and the semiconductor module are arranged on an upper side from the center of the housing.

3. The power conversion apparatus according to claim 1, further comprising a cooling unit configured to enable a cooling fluid to flow in the housing, wherein the power supply capacitor is arranged upstream of a flow path of the cooling fluid; and
  the snubber device and the semiconductor module are arranged downstream of the flow path of the cooling fluid.

4. The power conversion apparatus according to claim 3, wherein the power supply capacitor is arranged in an inlet part of the cooling fluid into the housing.

5. The power conversion apparatus according to claim 1, further comprising a heat shield plate provided between the snubber device and the semiconductor module and the power supply capacitor.

6. The power conversion apparatus according to claim 1, further comprising a heat sink attached to the semiconductor module.

7. The power conversion apparatus of claim 1 further comprising:
  a plurality of semiconductor modules electrically connected to the snubber device; and
  a plurality of heat sinks each of which being attached to at least one of the plurality of semiconductor modules.

8. The power conversion apparatus according to claim 7, further comprising
  wherein the plurality of semiconductor modules is connected to the power supply capacitor by different wires.

9. A snubber device to be mounted to terminals of a semiconductor module, the snubber device comprising:
  n (n: integer of 1 or greater) parallel charge paths each of which having a positive-side capacitor, a first diode, and a negative-side capacitor sequentially connected in series between a positive-side terminal and a negative-side terminal of the semiconductor module, and configured to enable current to flow from the positive-side terminal toward the negative-side terminal; and
  (n+1) parallel discharge paths each of which having a second diode connected between the negative-side terminal or the negative-side capacitor of an $N^{th}$ charge path (N: integer within a range of 0≤N≤n) of the n charge paths and the positive-side capacitor of a (N+1)$^{th}$ charge path of the n charge paths or the positive-side terminal, and configured to enable current to flow from the negative-side terminal toward the positive-side terminal via at least one of the negative-side capacitor and the positive-side capacitor, wherein
  a wiring inductance of each charge path is smaller than a wiring inductance of each discharge path.

10. The snubber device according to claim 9, wherein n is an integer of 2 or greater; and
  a wiring length of each wiring part between the positive-side capacitor and the negative-side capacitor of each of the n charge paths is shorter than a wiring length of each wiring part, which connects the negative-side capacitor of the $N^{th}$ charge path and the positive-side capacitor of the (N+1)$^{th}$ charge path, of each of the (n+1) discharge paths.

11. The snubber device according to claim 10, wherein the wiring part of each of the (n+1) discharge paths is formed with detouring.

12. The snubber device according to claim 10, wherein the each charge path is linearly arranged between the positive-side terminal and the negative-side terminal.

13. The snubber device according to claim 9, wherein the positive-side capacitor, the negative-side capacitor, the first diode and the second diode are arranged on a printed wiring board.

14. The snubber device according to claim 13, wherein each wiring, which connects the negative-side capacitor of the $N^{th}$ charge path and the positive-side capacitor of the (N+1)$^{th}$ charge path, of each of the (n+1) discharge paths comprises two regions overlapping each other.

15. A power conversion apparatus comprising:
  at least one snubber device according to claim 9;
  a plurality of semiconductor modules electrically connected to the at least one snubber device; and
  a plurality of heat sinks each of which being attached to at least one of the plurality of semiconductor modules.

16. The power conversion apparatus according to claim 15, wherein the plurality of semiconductor modules is configured to generate polyphase AC power from DC power; and
  the power conversion apparatus comprises at least one heat sink for each phase of the AC power.

17. The power conversion apparatus according to claim 15, wherein the plurality of semiconductor modules is configured to generate at least single phase AC power from DC power; and
  the power conversion apparatus comprises the plurality of heat sinks for each phase of the AC power.

18. The power conversion apparatus according to claim 15, wherein the plurality of semiconductor modules is configured to generate polyphase AC power from DC power; and
  the plurality of heat sinks is attached to some of the plurality of semiconductor modules configured to generate at least two phases of the polyphase AC power.

19. The power conversion apparatus according to claim 15, wherein each of the plurality of heat sinks is attached to one semiconductor module.

20. The power conversion apparatus according to claim 15, further comprising
  a power supply capacitor connected between the positive-side terminal and the negative-side terminal, wherein
  the plurality of semiconductor modules is connected to the power supply capacitor by different wires.

* * * * *